United States Patent [19]

Thiele

[11] E Re. 29,375

[45] Reissued Aug. 30, 1977

[54] LAMINATED POLYMERIC ARTICLES AND PROCESS FOR THE PRODUCTION THEREOF

[75] Inventor: William Charles Thiele, Somerville, N.J.

[73] Assignee: Johns-Manville Corporation, Denver, Colo.

[21] Appl. No.: 687,974

[22] Filed: July 28, 1976

Related U.S. Patent Documents

Reissue of:

[64] Patent No.: 3,931,836
Issued: Jan. 13, 1976
Appl. No.: 406,750
Filed: Oct. 15, 1973

U.S. Applications:

[63] Continuation-in-part of Ser. No. 225,662, Feb. 11, 1972, abandoned.

[51] Int. Cl.[2] ..... F16L 9/16; F16L 9/12; B32B 31/06; B32B 27/12

[52] U.S. Cl. ..... 138/141; 138/145; 138/146; 156/330; 156/332; 156/334; 156/335; 156/392; 428/414; 428/415; 428/417; 428/36; 428/519; 428/520; 428/521; 428/522; 427/372 R; 427/375; 427/386; 427/333

[58] Field of Search ..... 138/140, 141, 145, 146, 138/149, 172, 174, 137, 177; 156/330, 332, 335, 334, 392; 428/417, 414, 415, 412, 520, 519, 521, 522; 427/333, 372, 375, 386

[56] References Cited

U.S. PATENT DOCUMENTS

| | | | |
|---|---|---|---|
| 2,815,043 | 12/1957 | Kleiner | 138/146 |
| 3,002,534 | 10/1961 | Noland | 138/145 |
| 3,496,250 | 2/1970 | Gzerwinski | 260/836 |
| 3,628,991 | 12/1971 | Thiele | 428/36 |
| 3,686,359 | 8/1972 | Soldatos | 260/836 |

FOREIGN PATENT DOCUMENTS

| | | |
|---|---|---|
| 1,669,973 | 6/1971 | Germany |
| 1,210,268 | 10/1970 | United Kingdom |

OTHER PUBLICATIONS

"Polymers in Naval Machine Engineering" *Publ. Sudostroyenic* (Leningrad, Russia), pp. 126–129, Feb. 25, 1974.

*Primary Examiner*—Ellis Robinson
*Attorney, Agent, or Firm*—Robert M. Krone; Joseph J. Kelly; James W. McClain

[57] ABSTRACT

A process is provided for bonding otherwise incompatible resin systems to form laminated resinous articles. A first resin layer is coated with a solvated coating which forms a surface solution with the surface of the first layer. Thereafter, a second resin layer is bonded to the coating. The coating contains a butadiene resin, a portion of the resin used in the second layer, and curing agent for the resin. The process is particularly adapted to bonding polyvinyl chloride pipe cores to epoxy-impregnated glass fiber overwrap to form improved laminated plastic pipe.

21 Claims, No Drawings

LAMINATED POLYMERIC ARTICLES AND PROCESS FOR THE PRODUCTION THEREOF

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of application Ser. No. 225,662, filed Feb. 11, 1972 *now abandoned.*

BACKGROUND OF THE INVENTION

Field of the Invention

This invention relates to the bonding of two dissimilar polymeric resin composition surfaces. In a particular embodiment, the invention relates to a process for bonding an epoxy resin matrix reinforced with glass fibers to the surface of polyvinyl chloride pipe whereby the pipe is reinforced and withstands high pressures without rupture of the interface bond between the epoxy resin and the polyvinyl chloride surface.

For some time plastic pipe made of one or more layers each of polyvinyl chloride and epoxy-impregnated glass fibers has been widely used in the construction and plumbing industries. Light weight and resistance to corrosion have been among the desirable properties of this type of pipe. This pipe conventionally consists of an inner hollow cylinder of polyvinyl chloride overlaid with a wrapping of epoxy-impregnated glass fibers. In some cases only a single layer of each material is used; in other cases, however, the first layer of epoxy-impregnated glass fibers is overlaid with a second polyvinyl chloride layer, which is itself then overlaid with a second layer of epoxy-impregnated glass fiber. Any number of such multiple alternating layers may be thus built up.

Bonding between each pair of dissimilar surfaces of the alternating layers of epoxy-impregnated glass fiber and polyvinyl chloride has, however, been a serious problem, often reaching critical dimensions where the pipe consists solely of a relatively thin polyvinyl chloride inner cylinder overlaid with only one or two layers of an epoxy-impregnated glass fiber wrapping. Since polyvinyl chloride and epoxy do not substantially chemically bond with each other, mechanical forces were depended upon to maintain the integrity between the layers of the pipe. However, these mechanical forces were insufficient to withstand the countervailing forces produced by the fluid pressure within the pipe, and the layers of the pipe would become separated. This was particularly aggravated whenever it was necessary to cut into the pipe, as with a conventional pipe joint, thereby exposing the interface in the cut cross-section of the pipe to the full line pressure carried within the pipe.

Description of the Prior Art

Pipe manufacturers have for some time attempted to overcome the above-mentioned problem by seeking various means for creating a strong bond between the alternating layers of polyvinyl chloride and epoxy-impregnated glass fiber. These attempts have been substantially hindered, however, by the characteristic inertness and chemical resistance of polyvinyl chloride and related resins. The chemical reactions of these materials are generally substantially confined to those of degradation in heat or strong radioactive environments. Conventional attempts to achieve chemical bonds of epoxy resins, directly or indirectly, to polyvinyl chloride or related resins have been substantially ineffective and have failed to overcome the problems noted.

Typical of the conventional and/or prior adhesives and surface treatments which have heretofore proven to be unsatisfactory are those described in U.S. Pat. Nos. 2,815,043; 3,002,534; and 3,447,572; as well as British Pat. No. 907,763.

Recently in U.S. Pat. No. 3,628,991 a process was described in which an acrylonitrile-[butadinestypene] *butadiene-styrene* (ABS) copolymer dissolved in a mutual solvent for polyvinyl chloride and ABS was applied to the surface of the polyvinyl chloride pipe to form a surface solution. The epoxy-impregnated glass fiber layer was then overwrapped in contact with this ABS-containing surface solution and bonded to the ABS. This approach achieved a notable measure of success in creating a satisfactory bond between the polyvinyl chloride inner cylinder and the epoxy-impregnated glass fiber overwrap.

BRIEF SUMMARY OF THE INVENTION

The invention herein is an improvement in a process for bonding together a first resinous layer containing *as* a major component a first polymeric resin and a second resinous layer containing as a major component a second polymeric resin, the second polymeric resin being *liquid,* thermosetting, dissimilar to and substantially chemically unbondable directly to the first polymeric resin; the process comprising forming a surface solution, on the surface of the first resinous layer, of the first polymeric resin and a coating comprising a third polymeric resin and a mutual solvent for the first and third polymeric resins, where the third polymeric resin is substantially curable to the second polymeric resin and substantially chemically unbondable directly to and substantially [imcompatible] *incompatible* with the first polymeric resin other than in a solvated state; at least partially fusing the surface solution; applying to the coating the second resinous layer containing the second polymeric resin in a substantially uncured form; and curing the second polymeric resin and simultaneously bonding the second resinous layer to the coating. The improvement herein comprises incorporating into the coating [the second polymeric] *a solid thermosetting epoxy, phenolic or polyester* resin and a curing agent [for the second polymeric resin, and during the curing step bonding the second polymeric resin in the coating to the second polymeric resin in the second resinous layer] *therefor.*

In a preferred embodiment, the invention comprises an improvement in a process for bonding together a polyvinyl chloride layer and [an] *a liquid* epoxy-impregnated fiber glass layer, the process comprising forming a surface solution, on the surface of the polyvinyl chloride layer, of polyvinyl chloride and a coating containing a butadiene resin and a mutual solvent for the polyvinyl chloride and the butadiene resin; at least partially fusing the surface solution; applying to the coating the epoxy-impregnated fiber glass layer containing the epoxy resin in a substantially uncured form;

and curing the epoxy resin and simultaneously bonding the epoxy-impregnated fiber glass layer to the coating. The improvement of this preferred embodiment comprises incorporating *a solid* epoxy resin and a curing agent therefor into the coating [and during the curing step bonding the epoxy resin in the coating to the epoxy resin in the epoxy-impregnated fiber glass layer].

The invention also contemplates an improved laminated article, particularly a multilayer pipe, produced and bonded in the manner [discribed] *described* herein. Consequently the invention also encompasses a laminated article having improved bonding between the laminae comprising a first resinous layer containing as a major component a first polymeric resin and a second resinous layer containing as a major component a second polymeric resin, the second polymeric resin being a *liquid* thermosetting resin which is dissimilar to and substantially chemically unbondable directly to the first polymeric resin; the first and second polymeric resins being bonded into a laminate by a coating therebetween and in intimate contact therewith, the coating initially comprising (1) a third polymeric resin, which is thermoplastic, substantially curable to the second polymeric resin and substantially chemically unbondable directly to and substantially incompatible with the first polymeric resin other than in a solvated state; (2) [the second polymeric] *a solid thermosetting epoxy, phenolic or polyester* resin; (3) a mutual solvent for at least the first and third polymeric resins; and (4) a curing agent for the [second polymeric] *solid thermosetting* resin; the coating and the first polymeric resin forming a fused surface solution on the surface of the first resinous layer and the coating and the second resinous layer being chemically bonded.

In a preferred embodiment, the invention also encompasses a laminated article, having a superior bond between the laminae, which consists essentially of a polyvinyl chloride layer and an *initially liquid* epoxy resin impregnated fiber glass layer, the layers being bonded into a laminate by a coating therebetween and in intimate contact therewith, the coating initially comprising: (1) an acrylonitrile-butadiene-styrene resin; (2) *solid* epoxy resin; (3) a mutual solvent for at least the polyvinyl chloride and the acrylonitrile-butadiene-styrene resin; and (4) a curing agent for the *solid* epoxy resin; with the coating and the polyvinyl chloride forming a surface solution on the surface of the polyvinyl chloride layer and the coating and the epoxy-impregnated fiber glass layer being chemically bonded. In a particularly preferred embodiment, the laminated article having the improved bond between the laminae comprises a polyvinyl chloride hollow inner cylinder, an outer layer thereupon of an epoxy resin matrix reinforced with glass fibers, and a coating bonding the inner cylinder and the outer layer which initially comprises acrylonitrile-butadiene-styrene resin, epoxy resin, methyl ethyl ketone, and an equimolar complex of diacetoneacrylamide and diethylenetriamine.

DETAILED DESCRIPTION AND PREFERRED EMBODIMENTS

This invention is a novel method of bonding two dissimilar and otherwise unbondable resinous compositions. While the process of this invention is widely applicable to bonding any two such materials in any field of application, the process finds a particularly important use in the bonding of alternate layers of polyvinyl chloride and related resins to layers of epoxy and related polymeric materials. An important specific application of this process lies in a method for producing plastic pipe composed of alternating layers of polyvinyl chloride resin and epoxy-impregnated glass fibers.

The process of this invention enables strong bonds to be formed between layers of dissimilar and otherwise generally unbondable resinous compositions. Pipe produced by the method described herein has good integrity and substantial resistance to separation at the interfaces within the pipe wall. Further, where it is necessary to cut into or through the pipe wall and expose one or more of the interfaces, the method of this invention can be used quite effectively to seal the cut surface and prevent exposure of the interface to the line pressure within the pipe, thereby preventing separation of the pipe wall at that interface.

The "first polymeric resin," as defined herein, may be any of a wide variety of substantially chemically inert polymeric resins which can form surface solutions with the coatings described herein. Typical of the first polymeric resins suitable for use in this invention are poly(vinyl acetate), poly(methyl methacrylate), polystyrene, polybutene, poly(vinyl butyral), and the polymeric olefinic chlorides, notably poly(vinylidene chloride), poly(vinyl chloride) and copolymers thereof. The polymeric olefinic chlorides (which are referred to herein collectively as "polyvinyl chloride") are the preferred "first polymeric resin."

The "second polymeric resin" is [a] *an initially liquid* thermosetting resin selected from the group consisting of epoxy resins, polyester resins and phenolic resins. Of these, the epoxy resins are preferred. These are reaction products of epoxide compounds with compounds having available hydrogen atoms linked to carbon atoms by oxygen atoms. Examples of the latter are the polyhydric phenols and the polyhydric alcohols. A typical epoxy resin useful in this invention is the reaction product of epichlorohydrin and a polyhydric phenol such as bisphenol-A. Other illustrative epoxy resins typically include reaction products of epihalohydrins and polyhydric alcohols such as ethylene glycol, propylene glycol, trimethylene glycol, and the like. Also quite satisfactory in the process of this invention are the epoxy silanes; these are often used as the binding matrix for glass fibers as described, for instance, in U.S. Pat. No. 3,391,052.

Other suitable epoxy resins include the epoxy novalak resins such as the epoxy phenol novalak resins. These are basically novalak resins whose phenolic hydroxyl groups have been converted to glycidyl ethers. Other suitable epoxy resin types include p-amine phenol epoxies, as well as cycloaliphatics in which the epoxide group are directly attached to the cycloaliphatic ring and epoxy ethers.

The phenolic resins include those produced by reacting phenol with an aldehyde. The commercial phenols used are phenol, cresols, xylenols, p-tert.-butylphenol, p-phenyl-phenol, bisphenols and resorcinol. The most important aldehydes are formaldehyde and furfural. Preferred among the phenolic resins are those formed by the reaction of phenol and formaldehyde. The phenolic resin may be formed by either addition or condensation reactions in the presence of either acid or base.

The polyester resins are formed by the reaction of polyfunctional acids or anhydrides and alcohols. A typical polyester resin is prepared by reacting phthalic anhydride, maleic anhydride, and propylene glycol.

The "third polymeric resin," used in the process of this invention must be a butadiene resin. This may include polybutadiene itself or any of a variety of copolymers or terpolymers such as butadiene-styrene resin, acrylonitrile-butadiene resin, acrylonitrile-butadiene-styrene resin (ABS), mixtures thereof and the like. In the process of this invention it is required that the third polymeric resin be a butadiene resin; other materials have found not to be equivalent.

Preparation methods for all the resins mentioned in the preceding paragraphs are well known and amply described in the art. Any of the known preparation methods are suitable to prepare the resins for use in this invention.

The particular solvent used in process of this invention will depend upon the nature of the three polymeric resins which are being used. The particular solvent chosen must be one in which the first and the third polymeric resins are mutually soluble and preferably one in which all three resin components are soluble. Those solvents in which the second resin component is not readily soluble should still be such that the resinous material may be dispersed in the solvent in comminuted form. Typical solvents include tetrahydrofuran, methyl ethyl ketone, cyclohexanone, methylene chloride, acetone, ethyl acetate, isophorone, and the like. When the first polymeric resin is a polyvinyl chloride and the third is ABS, the preferred solvents are tetrahydrofuran and methyl ethyl ketone.

The curing agents for the epoxy resins are commonly the aliphatic and aromatic polyamines or anhydrides. Typical of these are diethylenetriamine, triethylenetetramine, m-phenylenediamine, methylene dianiline or mixtures thereof; the principal anhydrides are phthalic, tetrahydrophthalic, hexahydrophthalic, "Nadic Methyl," and trimellitic. Other curing agents such as amides (e.g., diacetoneacrylamide) are also known.

The exact composition and concentration of the components in the first and the second resinous layers are not critical. Each component will be selected primarily because of the particular properties desired in the finished material. Thus, in a typical pipe composition the inner polyvinyl chloride cylinder will be composed essentially all (i.e., usually about 90 percent or greater) of polyvinyl chloride with a small amount of conventional additive material such as stabilizers, anti-oxidants, colorants, etc. Similarly, the layer of epoxy-impregnated glass fiber will consist of a range of concentrations of continuous filament glass fibers in an epoxy matrix and may also include materials such as colorants, anti-oxidants, stabilizers, curing agents, etc. in small amounts. The various concentrations of epoxy and glass will depend on the properties desired in the finished pipe. In these cases as in all others involving the various materials which may be in the first and/or second resinous layer, there is much prior art describing the various materials and their properties. Those skilled in the art will find no difficulty in selecting suitable compositions from the prior art for use in the process of this invention.

For the purpose of this invention, therefore, first and second resinous layers are considered suitable if they are not generally bondable to each other (for if they are, they may be bonded by means other than the process of this invention) and if they each contain the respective first and second polymeric resins as principal components. "Principal component" as used herein is defined to mean a component which is present in sufficient quantity so as to contribute substantially to the bonding process of this invention. Generally this will mean that the particular components will comprise 40 to 50 percent or more, up to 100 percent, of the particular polymeric composition being considered. Such a component may, however, be present in a smaller concentration if the other components are relatively inert and/or the component in question provides a major part of the bonding function. Thus, for instance, in an epoxy-impregnated glass fiber layer, the epoxy resin may vary over a wide range of concentration and yet be considered a principal component, for the other important component in the system, glass fiber, is inert and does not participate in the bonding process. It is, of course, important that a "principal component" be present in sufficient amount to materially participate in the bonding function; small or trace amounts of a component which provide only a small amount of bonding are not considered to be within the scope of this invention.

The novel coating layer initially consists essentially of four components: [the same resinous component which is found in the second polymeric resin composition, i.e., the second polymeric resin which is the] *a solid thermosetting* epoxy, polyester or phenolic resin; the third (butadiene) polymeric resin; a curing agent for the [second polymeric] *solid thermosetting* resin; and a solvent which is a mutual solvent for both the first and third polymeric resins and preferably also a solvent for the [second polymeric] *solid thermosetting* resin. All components are dissolved in or dispersed in this solvent in the coating layer. During the process herein the solvent will evaporate. Consequently, the final laminae will be bound by a three-component coating containing the two resins and the curing agent.

The second and third polymeric resins should be present in the coating in a weight ratio of from 1:10 to 5:1, preferably 1:6 to 3:1. The overall concentration of both resins will total from 5 to 60 weight percent of the total coating composition, preferably 10–50 weight percent. The concentration of the solvent will range from 40 to 95 weight percent, preferably 60–85 weight percent. The curing agent will be present as from 5 to 35, preferably 11–25 phr (parts by weight per 100 parts by weight of second polymeric resin in the coating composition).

While the theory by which the novel coating herein operates to produce the superior bonding properties has not been experimentally proved, it is believed that the curing agent present may be in effect less than the stoichiometric amount required to completely cure the second resin component of the coating. There thus may be some uncured resin available to bond with the second resin in the second layer and be cocured therewith in the final curing step. By "in effect less than stoichiometric" is meant that whatever amount of curing agent is added, there may still be incomplete reaction with the second resin; i.e., the stoichiometric reaction may not have occurred. On the other hand, since the degree of cure of the resin cannot be readily measured, the above theory is not intended to be limiting. It is recognized that there may be a complete curing of the second resin in the coating and then subsequent bonding of the second resin components of the coating and the second layer by one or more other mechanisms.

The coating will be placed on the underlying first resinous layer (e.g., the polyvinyl chloride resin) in a quantity sufficient to dissolve the outer surface portion of the first resinous layer and to form a surface solution of that portion with the coating. Care should be taken, however, that the quantity of coating used is not so great as to dissolve a major portion of the first resinous layer and thereby to weaken or materially change the properties of that composition. Those skilled in the art of adhesion and bonding will be well aware of the proper amount of coating to be used on a particular resin composition substrate to achieve a good bond without seriously diminishing the desirable properties of that substrate. The quantity of coating is such as to normally penetrate the surface of the first polymeric resin composition to a depth of about 0.5 to about 3 mils and to form a surface coating thickness of up to about 7 mils.

In the practice of the process of this invention the underlying first resinous substrate is first cleaned of any foreign matter which might detrimentally affect the formation of a good bond. The coating composition containing the second and third polymeric resins and curing agent (all dissolved and dispersed in the solvent) is wiped, painted, sprayed or otherwise placed on the cleaned surface of the first polymeric resin composition substrate, and generally then worked into the surface to form a relatively homogeneous surface solution having the characteristics described above.

The coated first layer is then heated to a temperature of 100°-200° F, preferably 100°-150° F, and held for 1-10 hours. This heating serves to precondition the first layer and the coating for the final curing step. In addition, the surface solution is at least partially fused at this time. Some degree of curing of the second resin in the coating is also believed to take place simultaneously.

Thereafter a second layer which consists of a second polymeric resin composition is applied to and placed in contact with the surface of the coating. The second polymeric resin in the second polymeric resin composition will be in a substantially uncured state. It is believed that this uncured resin subsequently cocures with any uncured portion of second polymeric resin present in the first coating, or otherwise bonds with cured portions of the coating resin. The concentration of the second polymeric resin in the layer may, as noted above, vary over quite a wide range, particularly where the layer also contains inert materials such as glass fibers. The layer may be sprayed, painted, wiped or otherwise applied to the surface solution, preferably in a wet form. In a preferred embodiment the layer is in the form of a tape or wrapping which is laid or wrapped on or around the substrate and surface solution. [This,] *Thus,* when pipe is to be formed by the process of this invention, the inner cylinder (e.g., polyvinyl chloride) is first coated on its outer surface with the solvated coating, thus dissolving a small amount of that outer surface. Thereafter, following heating of the surface solution, coating and inner cylinder, an epoxy-impregnated fiberglass-containing tape is wrapped continuously and tightly around the cylinder bringing the tape into intimate contact with surface solution.

Following the application of the outer layer the second polymeric resin is cured by conventional curing means. Generally this involves heating the entire assemblage so as to thermally cure the second polymeric resin. At the same time any uncured portion of the second polymeric resin in the surface solution is cured. The heat applied will, of course, be kept sufficiently low such that the other polymeric resins in the entire assemblage as well as any fillers or additives or other materials which may be present will be not detrimentally affected. Such curing techniques are well known to those skilled in the art and need not be exemplified here. I have found that for the compositions exemplified below, cure temperatures of about 130°-180° F for 1-10 hours produce entirely satisfactory bonds.

Although the details above have been described in terms of a single layer of each of the two polymeric resin compositions, it is evident that the process of this invention is fully applicable to multiple layer compositions in which the first and second resinous layers alternate.

The following examples will illustrate the process of this invention. In each case the first polymeric composition was a 4 in. O.D. polyvinyl chloride hollow cylindrical pipe core. Each core was brushcoated with the particular experimental coating solution, heated about 6 hours at 145° F, and then overwrapped with ½-inch fiberglass cloth tape saturated with an epichlorohydrin-Bisphenol A type [solid] *liquid* epoxy resin [(commercially available from Shell Chemical Company under the name "Epon Resin 1001")]. The glass tape was applied in a single layer. The final assemblage was then cured for about 8 hours at 150° F. Curing agents, solvents and the like are as described below.

Coatings were prepared containing a mixture of ABS resin (commercially available from Marbon Chemical Company as "Marbon E-1000 ABS") and ["Epon Resin 1001" epoxy] *a solid epoxy resin (commercially available from Shell Chemical Company under the name "Epon Resin 1001")* dissolved in methyl ethyl ketone. The curing agent was an equimolar complex of diacetoneacrylamide and diethylenetriamine (commercially available from the Lubrizol Corporation as "Lubrizol CA-21"). The methyl ethyl ketone solvent was generally present as approximately 50 to 80 weight percent of the coating; the curing agent was present in a concentration of approximately 12-14 phr.

In the table below the results of various experiments performed to measure the adhesion of the different bonding systems are recorded. The degree of adhesion was measured by bonding the two surfaces in accordance with this invention and then simply pulling them apart. The relative degree of difficulty of separation of the bonded materials was rated (in part subjectively) on a scale of 0 to 4. A rating of 0 indicates that no significant bond was formed. A rating of 4 indicates that an excellent bond was formed, i.e., that the bonded materials were separated only with extreme difficulty and that it was the bonding coating itself which separated cohesively; its adhesive bond to either of the polyvinyl chloride or the epoxy-impregnated glass fibers did not separate. Since the tensile strength of the bonding coating is on the order of 2,000 psi, a bond rated 4 will have an adhesive strength of at least that value. The bonds rated 1, 2, and 3 represent intermediate degrees of adhesion of the coating. A bond rated 1 was one which could be separated with fairly little difficulty; a bond rated 2 was one which could be separated only with some difficulty; a bond rated 3 was one which could be separated only with considerable difficulty. Quantitative values were not assigned to these three ratings.

TABLE

| Example No. | Epoxy: ABS Weight Ratio | Curing Agent Conc., phr | Adhesion Rating |
|---|---|---|---|
| 1 | 0 (no epoxy) | 0 | 0 |
| 2 | 0.05 | 12 | 0 |
| 3 | 0.10 | 12 | 1 |
| 4 | 0.175 | 12 | 2-3 |

TABLE-continued

| Example No. | Epoxy: ABS Weight Ratio | Curing Agent Conc., phr | Adhesion Rating |
|---|---|---|---|
| 5 | 0.25 | 12 | 2–4 |
| 6 | 0.25 | 13.8 | 3 |
| 7 | 0.33 | 12 | 3–4 |
| 8 | 0.35 | 13.8 | 3–4 |
| 9 | 0.43 | 12 | 3 |
| 10 | 0.45 | 13.8 | 3–4 |
| 11 | 0.55 | 13.8 | 3 |
| 12 | 0.65 | 12 | 3 |
| 13 | 0.65 | 13.8 | 2 |
| 14 | 0.70 | 12 | 3 |
| 15 | 0.75 | 13.8 | 1–2 |
| 16 | 4.0 | 12 | 1 |

It will be seen from these data that the process of this invention permits formation of strong bonds between otherwise incompatible resin systems. This in turn permits the production of laminated resinous materials, such as pipe, which have a heretofore unattainably high degree of integrity. It will also be seen that this invention produces a product with a bond significantly better than products with only the ABS and solvent in the coating, as are disclosed in aforesaid U.S. Pat. No. 3,628,991.

What is claimed is:

[1. In a process for bonding together a first resinous layer containing as a major component a first polymeric resin, said first polymeric resin being selected from the group consisting of poly(vinyl acetate), poly(methyl methacrylate), polystyrene, polybutene, poly(vinyl butyral) and the polymeric olefinic chlorides, and a second resinous layer containing as a major component a second polymeric resin, said second polymeric resin being thermosetting, dissimilar to and substantially chemically unbondable directly to said first polymeric resin and selected from the group consisting of epoxy resins, polyester resins and phenolic resins; which process comprises forming a surface solution, on the surface of said first resinous layer, of said first polymeric resin and a coating comprising a butadiene resin and a mutual solvent for said first polymeric resin and said butadiene resin, where said butadiene resin is substantially curable to said second polymeric resin and substantially chemically unbondable directly to and substantially incompatible with said first polymeric resin other than in a solvated state; at least partially fusing said surface solution; applying to said coating said second resinous layer containing said second polymeric resin in a substantially uncured form; and curing said second polymeric resin and simultaneously bonding said second resinous layer to said coating:

the improvement which comprises incorporating into said coating said second polymeric resin and a curing agent for said second polymeric resin, and during the curing step bonding said second polymeric resin in said coating to said second polymeric resin in said second resinous layer.]

[2. The improved process of claim 1 wherein said first polymeric resin is a polymeric olefinic chloride selected from the group consisting of poly(vinylidine chloride), poly(vinyl chloride) and copolymers thereof.]

[3. The improved process of claim 1 wherein said second polymeric resin is an epoxy resin.]

[4. The improved process of claim 1 wherein said butadiene resin is selected from the group consisting of polybutadiene, butadiene-styrene resin, acrylonitrile-butadiene resin, acrylonitrile-butadiene-styrene resin, and mixtures thereof.]

[5. The improved process of claim 1 wherein said mutual solvent for said first polymeric resin and said butadiene resin is a solvent in which said second polymeric resin is also soluble.]

[6. In a process for bonding together a poly(vinyl chloride) layer and an epoxy-impregnated fiber glass layer, said process comprising forming a surface solution, on the surface of the poly(vinyl chloride) layer, a poly(vinyl chloride) and a coating containing a butadiene resin and a mutual solvent for said poly(vinyl chloride) and said butadiene resin; at least partially fusing said surface solution; applying to said coating said epoxy-impregnated fiber glass layer containing said epoxy resin in a substantially uncured form; and curing said epoxy resin and simultaneously bonding said epoxy-impregnated fiber glass layer to said coating:

the improvement which comprises incorporating said epoxy resin and a curing agent therefor into said coating and during the curing step bonding said epoxy resin in said coating to said epoxy resin in said epoxy-impregnated fiber glass layer.]

[7. The improved process of claim 6 wherein said butadiene resin is an acrylonitrile-butadiene-styrene resin.]

[8. The improved process of claim 7 wherein said mutual solvent is selected from the group consisting of tetrahydrofuran and methyl ethyl ketone.]

[9. The improved process of claim 1 wherein said second polymeric resin is present in said coating in an amount of 0.1 to 5 parts by weight per part of said butadiene resin.]

[10. The improved process of claim 9 wherein said second polymeric resin is present in said coating in an amount of from 1/6 to 3 parts of weight per part by weight of said butadiene resin.]

[11. The improved process of claim 1 wherein said curing agent is present in said coating in an amount of from 5 to 35 parts by weight per 100 parts by weight of said second polymeric resin in said coating.]

[12. The improved process of claim 11 wherein said curing agent is present in the coating composition as 11 to 25 parts by weight per 100 parts by weight of said second polymeric resin in said coating.]

[13. A laminated article having improved bonding between the laminae comprising a first resinous layer containing as the principal component a polymeric olefinic chloride resin selected from the group consisting of polyvinyl chloride and copolymers of vinyl chloride and vinylidene chloride, and a second resinous layer containing as the principal component an epoxy resin, said first and second polymeric resins being bonded into a laminate by a coating therebetween and in intimate contact therewith, said coating initially comprising:

a a butadiene resin, which is thermoplastic, substantially curable to said epoxy resin and substantially chemically unbondable directly to and substantially incompatible with said polymeric olefinic chloride resin other than in a solvated state:

b said epoxy polymeric resin:

c a mutual solvent for at least said polymeric olefinic chloride resin and said butadiene resin: and d a curing agent for said epoxy resin;

said coating and said polymeric olefinic chloride resin forming a fused surface solution on the surface of said first resinous layer and said coating and said second resinous layer being chemically bonded; and said epoxy resin and said butadiene resin being present in said coating in a weight ratio of epoxy resin to butadiene resin in the range of 0.175:1 to 0.70:1.]

[14. The laminated article of claim 13 wherein said second resinous layer comprises an epoxy resin matrix containing glass fiber reinforcement.]

[15. The laminated article of claim 13 wherein said butadiene resin is selected from the group consisting of polybutadiene, butadiene-styrene resin, acrylonitrile-butadiene resin, acrylonitrile-butadienestyrene resin and mixtures thereof.]

[16. A laminated article having improved bonding between the laminae, which consists essentially of a poly(vinyl chloride) layer and an epoxy resin impregnated fiber glass layer, said layers being bonded into a laminate by a coating there-between and in intimate contact therewith, said coating initially comprising:

a. an acrylonitrile-butadiene-styrene resin:

b. epoxy resin:

c. a mutual solvent for at least said poly(vinyl chloride) and said acrylonitrile-butadiene-styrene resins; and d. a curing agent for said epoxy resin; with said coating and said poly(vinyl chloride) forming a surface solution of said poly(vinyl chloride) layer and said coating and said epoxy resin impregnated fiber glass layer being chemically bonded, and said epoxy resin and said acrylonitrile-butadienestyrene resin being present in said coating in a weight ratio of epoxy resin to acrylonitrile-butadiene-styrene resin in the range of 0.175:1 to 0.70:1.]

[17. The laminated article of claim 16 wherein said mutual solvent is selected from the group consisting of tetrahydrofuran and methyl ethyl ketone.]

[18. The laminated article of claim 16 wherein said laminae comprise a poly(vinyl chloride) hollow inner cylinder and an outer layer thereupon of epoxy resin matrix reinforced with glass fiber, and said coating bonding said inner cylinder and said outer layer comprises acrylonitrile-butadienestyrene resin, epoxy resin, methyl ethyl ketone, and a curing agent comprising an equimolar complex of diacetoneacrylamide and diethylenetriamine.]

[19. The improved laminated article of claim 13 wherein said curing agent is present in said coating in an amount of from 5 to 35 parts by weight per 100 parts by weight of said epoxy resin in said coating.]

[20. The improved laminated article of claim 19 wherein said curing agent is present in the coating composition as 11 to 25 parts by weight per 100 parts by weight of said epoxy resin in said coating.]

[21. The laminated article of claim 13 comprising a pipe.]

*22. In a process for bonding together a plastic layer comprising a thermoplastic poly(vinyl acetate), poly(methyl methacrylate), polystyrene, polybutene, poly(vinyl butyral) or polymeric olefinic chloride resin and a thermosetting layer comprising a liquid thermosetting epoxy, phenolic, or polyester resin, which layers are substantially chemically unbondable to each other;*

*which process comprises forming a surface solution, on the surface of said thermoplastic layer, of said thermoplastic resin and a coating comprising a butadiene resin and a mutual solvent for said butadiene resin and said thermoplastic resin; at least partially fusing said surface solution; applying to said coating said thermosetting layer in a substantially uncured state; and curing said thermosetting layer and simultaneously bonding said thermosetting layer to said coating;*

*the improvement which comprises increasing the strength of the bond formed in said curing step between said coating and said thermosetting layer by incorporating into said coating a solid thermosetting epoxy, phenolic or polyester resin and a curing agent therefor.*

*23. The improved process of claim 22 wherein said thermoplastic resin is a polymeric olefinic chloride selected from the group consisting of poly(vinylidine chloride), poly(vinyl chloride) and copolymers thereof.*

*24. The improved process of claim 22 wherein both of said thermosetting resins are epoxy resins.*

*25. The improved process of claim 22 wherein said butadiene resin is selected from the group consisting of polybutadiene, butadiene-styrene resin, acrylonitrile-butadiene-styrene resin, and mixtures thereof.*

*26. The improved process of claim 22 wherein said mutual solvent for said thermoplastic resin and said butadiene resin is a solvent in which said solid thermosetting resin is also soluble.*

*27. The improved process of claim 22 wherein said thermosetting resin is present in said coating in an amount of 0.1 to 5 parts by weight per part of said butadiene resin.*

*28. The improved process of claim 27 wherein said solid thermosetting resin is present in said coating in an amount of from 1/6 to 3 parts of weight per part by weight of said butadiene resin.*

*29. The improved process of claim 22 wherein said curing agent is present in said coating in an amount of from 5 to 35 parts by weight per 100 parts by weight of said solid thermosetting resin in said coating.*

*30. The improved process of claim 29 wherein said curing agent is present in the coating composition as 11 to 25 parts by weight per 100 parts by weight of said solid thermosetting resin in said coating.*

*31. In a process for bonding together a poly(vinyl chloride) layer and an epoxy-impregnated fiber glass layer; said process comprising forming a surface solution, on the surface of the poly(vinyl chloride) layer of poly(vinyl chloride) and a coating containing a butadiene resin and a mutual solvent for said poly(vinyl chloride) and said butadiene resin; at least partially fusing said surface solution; applying to said coating said epoxy-impregnated fiber glass layer containing said epoxy resin in a substantially liquid uncured form; and curing said epoxy resin and simultaneously bonding said epoxy-impregnated fiber glass layer to said coating;*

*the improvement which comprises increasing the strength of the bond formed in the curing step between the epoxy-impregnated fiber glass layer and the coating by incorporating into said coating a solid epoxy resin and a curing agent thereof.*

*32. The improved process of claim 31 wherein said butadiene resin is an acrylonitrile-butadiene-styrene resin.*

*33. The improved process of claim 32 wherein said mutual solvent is selected from the group consisting of tetrahydrofuran and methyl ethyl ketone.*

*34. A laminated article having improved bonding between the laminae comprising a thermoplastic layer containing as the principal component a polymeric olefinic chloride resin selected from the group consisting of polyvinyl chloride and copolymers of vinyl chloride and vinylidene chloride, and a thermosetting layer containing as the principal component an epoxy resin, said layers being bonded into a laminate by a coating therebetween and an*

*intimate contact therewith, said coating initially comprising:*

*a. a butadiene resin, which is thermoplastic, substantially curable to said epoxy resin and substantially chemically unbondable directly to and substantially incompatible with said polymeric olefinic chloride resin other than in a solvated state;*

*b. a solid epoxy resin;*

*c. a mutual solvent for at least said polymeric olefinic chloride resin and said butadiene resin; and*

*d. a curing agent for said solid epoxy resin;*

*said coating and said polymeric olefinic chloride resin forming a fused surface solution on the surface of said thermoplastic layer and said coating and said thermosetting layer being chemically bonded; and*

*said solid epoxy resin and said butadiene resin being present in said coating in a weight ratio of epoxy resin to butadiene resin in the range of 0.175:1 to 0.70:1.*

*35. The laminated article of claim 34 wherein said thermosetting layer comprises an epoxy resin matrix containing glass fiber reinforcement.*

*36. The laminated article of claim 34 wherein said butadiene resin is selected from the group consisting of polybutadiene, butadiene-styrene resin, acrylonitrile-butadiene resin, acrylonitrile-butadiene-styrene resin and mixtures thereof.*

*37. The improved laminated article of claim 34 wherein said curing agent is present in said coating in an amount of from 5 to 35 parts by weight per 100 parts by weight of said solid epoxy resin in said coating.*

*38. The improved laminated article of claim 37 wherein said curing agent is present in the coating composition as 11 to 25 parts by weight per 100 parts by weight of said solid epoxy resin in said coating.*

*39. The laminated article of claim 34 comprising a pipe.*

*40. A laminated article having improved bonding between the laminae, which consists essentially of a poly(vinyl chloride) layer and an epoxy resin impregnated fiber glass layer, said layers being bonded into a laminate by a coating therebetween and in intimate contact therewith, said coating initially comprising:*

*a. an acrylonitrile-butadiene-styrene resin;*

*b. a solid epoxy resin;*

*c. a mutual solvent for at least said poly(vinyl chloride) and said acrylonitrile-butadiene-styrene resins; and*

*d. a curing agent for said solid epoxy resin;*

*with said coating and said poly(vinyl chloride) forming a surface solution of said poly(vinyl chloride) layer and said coating and said epoxy resin impregnated fiber glass layer being chemically bonded, and*

*said solid epoxy resin and said acrylonitrile-butadiene-styrene resin being present in said coating in a weight ratio of solid epoxy resin to acrylonitrile-butadiene-styrene resin in the range of 0.175:1 to 0.70:1.*

*41. The laminated article of claim 40 wherein said mutual solvent is selected from the group consisting of tetrahydrofuran and methyl ethyl ketone.*

*42. The laminated article of claim 40 wherein said laminae comprise a poly(vinyl chloride) hollow inner cylinder and an outer layer thereupon of epoxy resin matrix reinforced with glass fiber, and said coating bonding said inner cylinder and said outer layer comprises acrylonitrile-butadiene-styrene resin, solid epoxy resin, methyl ethyl ketone, and a curing agent comprising an equimolar complex of diacetoneacrylamide and diethylenetriamine.*

* * * * *

UNITED STATES PATENT AND TRADEMARK OFFICE

CERTIFICATE OF CORRECTION

PATENT NO. : Re: 29,375

DATED : August 30, 1977

INVENTOR(S) : William Charles Thiele

It is certified that error appears in the above-identified patent and that said Letters Patent are hereby corrected as shown below:

Column 4, lines 21 & 22, "poly(-vinyl acetate) should read --poly(vinyl acetate)--.

Column 8, line 9, following "is" insert --also--.

Column 12, line 55, (Claim 31), "thereof" should read --therefor--.

Signed and Sealed this

*Thirty-first* Day of *January 1978*

[SEAL]

*Attest:*

RUTH C. MASON
*Attesting Officer*

LUTRELLE F. PARKER
*Acting Commissioner of Patents and Trademarks*